United States Patent [19]
Ito et al.

[11] Patent Number: 5,447,664
[45] Date of Patent: Sep. 5, 1995

[54] METHOD OF LINING AN INNER SURFACE OF A PIPE

[75] Inventors: Takanori Ito; Masaki Natori, both of Tokyo; Masaaki Itagaki, Kanagawa; Shigeru Toyoda, Saitama, all of Japan

[73] Assignee: Tokyo Gas Co., Ltd., Tokyo, Japan

[21] Appl. No.: 134,828

[22] Filed: Oct. 12, 1993

[30] Foreign Application Priority Data

| Oct. 14, 1992 | [JP] | Japan | 4-301781 |
| Oct. 14, 1992 | [JP] | Japan | 4-301782 |
| Feb. 3, 1993 | [JP] | Japan | 5-039533 |
| Feb. 3, 1993 | [JP] | Japan | 5-039535 |

[51] Int. Cl.$^6$ ............................ B32B 35/00; E04B 1/16
[52] U.S. Cl. ............................ 264/35; 138/97; 156/94; 264/36; 264/40.5; 264/269
[58] Field of Search ............................ 264/31–36, 264/269, 40.5; 156/94, 98; 138/97

[56] References Cited

U.S. PATENT DOCUMENTS

| 2,804,147 | 8/1957 | Pistole et al. | 138/97 X |
| 3,041,204 | 6/1962 | Green | 138/97 X |
| 3,137,318 | 6/1964 | Maneri et al. | 138/97 |
| 3,662,045 | 5/1972 | Tierling | 264/269 X |
| 4,393,805 | 7/1983 | Boer | 138/97 X |
| 4,397,890 | 8/1983 | Kinumoto et al. | 138/97 X |
| 4,440,194 | 4/1984 | Kinumoto et al. | 138/97 X |
| 4,456,401 | 6/1984 | Williams | 264/36 X |
| 4,602,974 | 7/1986 | Wood et al. | 264/269 X |
| 4,622,196 | 11/1986 | Wood | 264/269 X |
| 4,985,196 | 1/1991 | LeDoux et al. | 264/269 X |
| 5,202,157 | 4/1993 | Tomoyasu et al. | 156/94 X |
| 5,230,842 | 7/1993 | Munde | 264/269 X |

FOREIGN PATENT DOCUMENTS 114773 4/1992 Japan .

Primary Examiner—Karen Aftergut
Attorney, Agent, or Firm—Nikaido Marmelstein Murray & Oram

[57] ABSTRACT

An amount of resin necessary for lining an inner surface of a pipe is calculated. A lining pig is inserted in the pipe from an open end thereof, and the calculated amount of resin is supplied in the pipe from the open end subsequent to the insertion of the lining pig. A blocking pig is inserted in the pipe behind the resin, and a pressurized non-compressible liquid is supplied in the pipe subsequent to the insertion of the blocking pig thereby feeding the charged resin through the blocking pig until a front end of the resin reaches an inner end of the pipe. The resin is sucked together with the lining pig and the blocking pig so that the inner surface of the pipe is lined with the resin.

7 Claims, 10 Drawing Sheets

METHOD OF LINING AN INNER SURFACE OF A PIPE

BACKGROUND OF THE INVENTION

The present invention relates to a method for lining an inner surface of a service pipe branched from a pipeline such as a gas main and a water main buried under a road. Due to deterioration of the pipe, it is necessary to line the inner surface of an old pipe with coating material such as resin.

In a known method of lining the service pipe with resin, the resin is injected from one end of the service pipe thereby rendering the resin to adhere on the inner surface of the pipe. The excessive resin which did not adhere thereon is retrieved from the other end. In order to carry out the repair, the roads must be dug up to expose the connection between the main and the service pipe which is to be treated, and the pipe disconnected from the main. The operation involves blocking of the traffic, and furthermore after the repair, joining the pipe to the main and mending the roads. Hence, the repair requires much labor, time and cost.

The applicant of the present invention has proposed in Japanese Patent Application Laid-Open 4-114773, a method for lining pipes without causing these problems. The method comprises a first step where a necessary amount of resin interposed between lining pigs in a mass is charged from an end opening of a service pipe and carried toward a gas main by injecting compressed air. In a second step, the resin is sucked from the end opening, thereby lining the wall of the pipe. Such a repairing operation can be efficiently performed without causing the above-described problems.

However, since the mass of resin is forward pushed by the compressed air, the mass is subjected to various changes of pressure caused by the compressed air. Namely, if the inner diameter of the pipe is locally small or large, the pressure of air changes when passing the irregular portions, causing the resin to be abruptly pushed forward. As a result, a part of the resin may erupt out through a gap formed about the lining pig at the front end of the mass and flows into the gas main.

Another problem of the conventional method is that there is no correlation between the quantity of the injected air and a travelling distance of the resin because the air is compressible. Accordingly, it is impossible to detect the front end position of the resin mass from the air quantity. As a result, an expensive device, such as a sonic probe, must be provided to detect the location of the front end of the resin mass, so that the cost of the repairing system increases.

SUMMARY OF THE INVENTION

An object of the present invention is to provide a method for lining a pipe without turning over roads, where the lining is accurately formed in the pipe.

In the method of the present invention an amount of resin necessary for lining an inner surface of a pipe is previously calculated. A lining pig is inserted in the pipe from an open end thereof and the calculated amount of resin is supplied in the pipe from the open end subsequent to the insertion of the lining pig. A blocking pig is inserted in the pipe behind the resin, and a pressurized liquid is supplied in the pipe subsequent to the insertion of the blocking pig thereby feeding the charged resin through the blocking pig until a front end of the resin reaches an inner end of the pipe. The resin is sucked together with the lining pig and the blocking pig so that the inner surface of the pipe is lined with the resin. The resin is supplied by pumping means, and the pressurized liquid is supplied and sucked by a pump.

In an aspect of the invention, a non-compressible liquid absorbing member is inserted between the resin and the blocking pig.

The other objects and features of this invention will become understood from the following description with reference to the accompanying drawings.

DETAILED DESCRIPTION OF THE PREFERRED EMBODIMENTS

Figure 1:
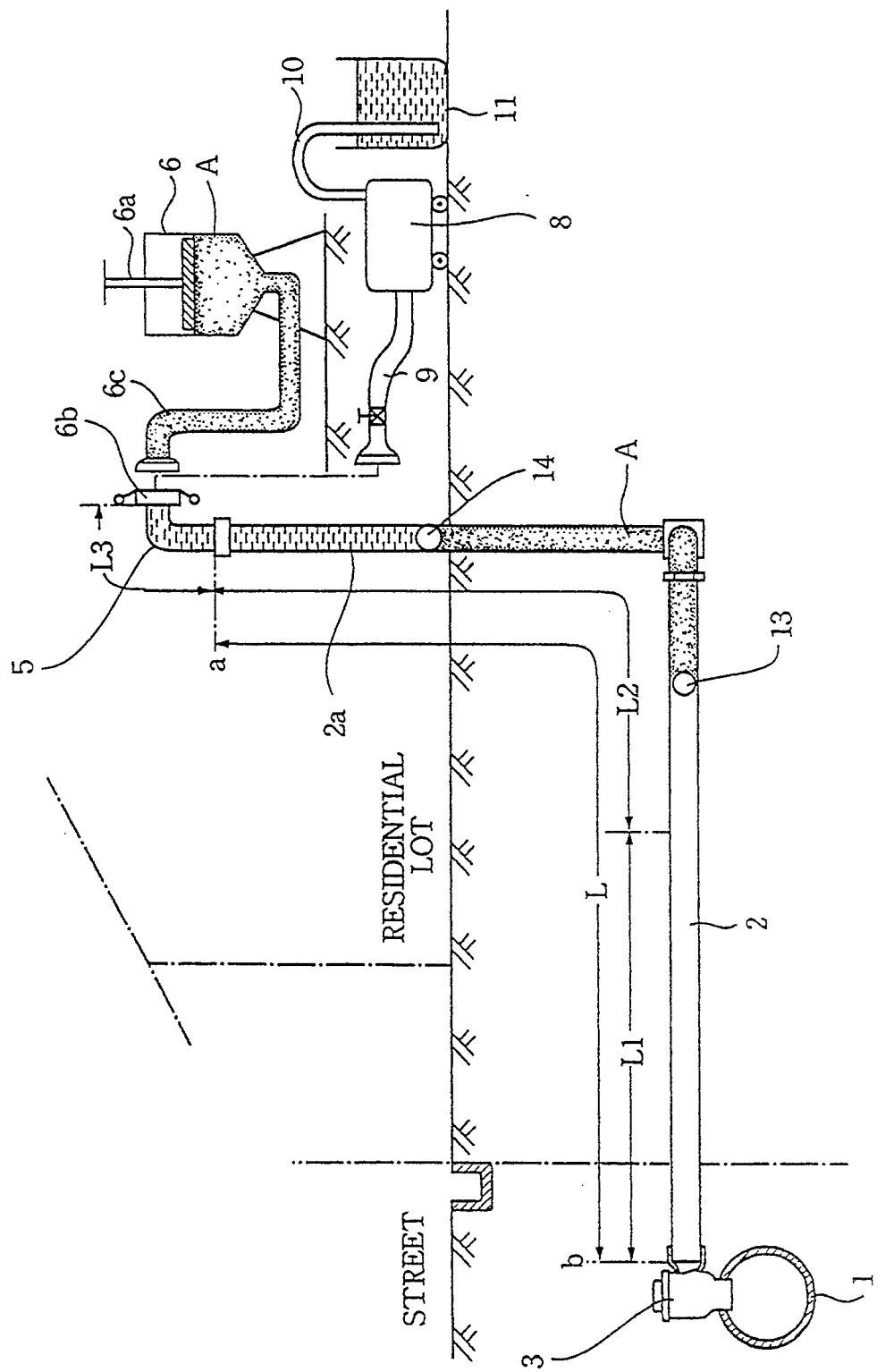
FIG. 1 is a diagram describing a first step for repairing a pipe in accordance with the present invention.

Referring to FIG. 1, the present invention is adapted to repair a service pipe 2 branched into a residential lot of a customer from a gas main 1 which is laid under a street. One end of the service pipe 2 is connected to the gas main 1 by way of a joint 3. The other end of the pipe 2 is connected with a service riser 2a, to an end of which a gas meter is normally connected.

A repairing system used for the method of the present invention has a tank 6 which is to be filled with resin A. The tank 6 has a pipe 6c which is to be connected to the service riser 2a through a bend 5 and a clamp coupling 6b instead of the gas meter during the repairing operation. A plunger 6a is provided in the tank 6 so as to inject the resin A into the pipe 2 passing through the pipe 6c.

In another stage of the operation, the service riser 2a is connected with a pump 8 through the bend 5, clamp coupling 6b, a water meter 7 (FIG. 2), and a hose 9. The pump 8 is further communicated with a water tank 11 through an intake hose 10. The pump 8 is provided for supplying and sucking water into and from the service pipe 2 and the service riser 2a.

The operation for lining the service pipe 2 and the service riser 2a is described hereinafter with reference to FIGS. 1 to 3.

First of all, the length L of which is the sum of the length of the service pipe 2 and the length of the service riser 2a is measured. Namely, the length L is a distance from a position a of an upper opening of the service riser 2a located at a residence of the customer and a position b at the other end opening of the pipe 2, that is at the joint 3. The length is measured, for example, by an acoustic measuring method. The quantity of the resin A necessary to line the pipe 2 and the riser 2a is calculated in accordance with the length L, the inner diameter of the pipe 2, and the desired thickness of the lining. Thus, the quantity of the resin A charged in the tank 6 is determined. The resin A is a thixotropic two-part epoxy resin consisting of main material and hardening material.

At the first step of the repairing operation, a gas meter is removed from the service riser 2a and the bend 5 with the clamp coupling 6b is attached thereto instead. The connection of the bend 5 is performed in such a manner that a large amount of the gas in the riser 2a does not leak. Thereafter, a spherical lining pig 13 is inserted in the pipe 2. The outer diameter of the lining pig 13 is so determined that a gap between the inner wall of the pipe 2 and the pig 13 corresponds to the desired thickness of the lining. The pipe 6c of the tank 6 is then attached to the clamp coupling 6b. Thereafter, the plunger 6a of the tank 6 is depressed to inject the resin A into the service riser 2a and the service pipe 2. When the whole resin A in the tank 6 is injected into the pipe and the bend 5, the pipe 6c is detached from the clamp coupling 6b. A blocking pig 14 is inserted in the bend 5.

The blocking pig 14 serves to urge the resin A forward into the service pipe 2 when water is supplied to the pipe, and to prevent the water from mixing with the resin A. The outer diameter of the pig 14 is substantially the same as the inner diameter of the pipe 2.

Figure 4F:
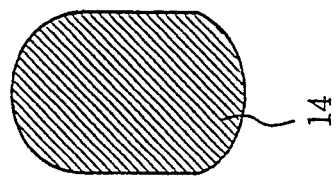
FIGS. 4a to 4f show various examples of a blocking pig used in accordance with the present invention.
Figure 4E:
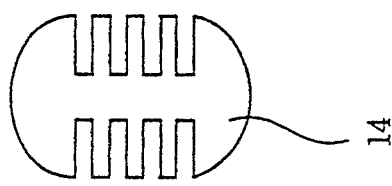
Figure 4D:
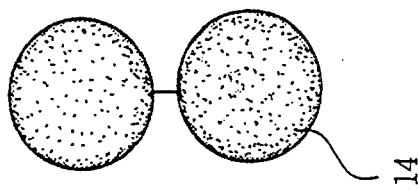
Figure 4C:
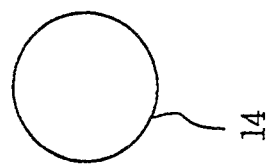
Figure 4B:
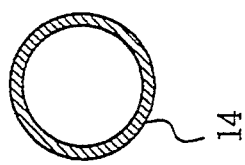
Figure 4A:
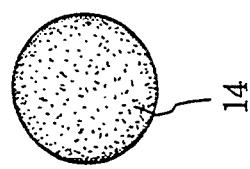

FIGS. 4a to 4f show various examples of the blocking pig 14. FIGS. 4a to 4c show the blocking pigs 14 of a sponge ball, hollow ball or a ball of closed-cell foam, respectively. The blocking pig 14 may further be two balls connected to each other as shown in FIG. 4d. Alternatively, an oval spheric sweeper having a plurality of fins (FIG. 4e) or a silicon oval spheric gel (FIG. 4f) may be used.

Figure 2:
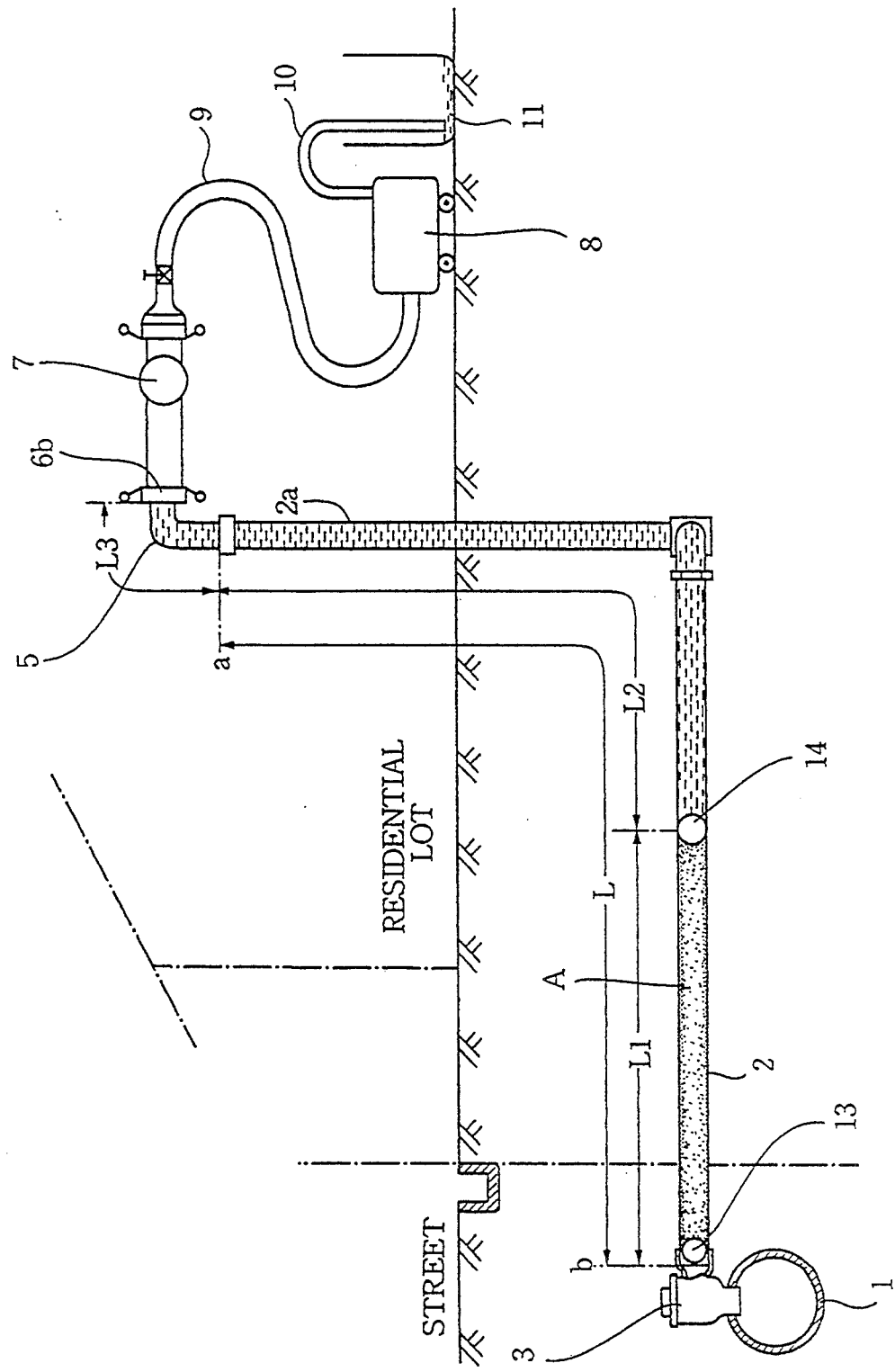
FIG. 2 is a diagram describing a second step of the repairing operation of FIG. 1.

Referring to FIG. 2, in the second step of the operation, the water tank 11 is connected to the bend 5 through the clamp coupling 6b, water meter 7, hose 9, pump 8 and the hose 10. When the pump 8 is driven, the water in the tank 11 is injected into the service riser 2a and the service pipe 2. As the water is supplied, the blocking pig 14, the mass of resin A and the lining pig 13 are pushed forward toward the joint 3 of the gas main 1 due to the difference between a pressure in a space formed in front of the lining pig 13 and a pressure behind the blocking pig 14 caused by the water.

Since water is non-compressible, the volume thereof does not change although there may be a change in the inner diameter of the pipe 2. In other words, the resin mass is moved in proportion to the quantity of the supplied water. Therefore, the resin A gently travels forward without abruptly erupting out through the gap between the lining pig 13 and the inner wall of the pipe 2.

Furthermore, due to the non-compressibility of water, the quantity of water necessary to fill the pipe 2 and the service riser 2a can be accurately calculated. Namely, there exists a correlation between the quantity of water detected by the water meter 7 and the length of the pipe. The quantity of water which is to be injected in the pipe 2 is calculated as follows.

A length L1 in the service pipe which the resin A takes up when the resin mass reaches the position b adjacent the gas main, that is the end of the pipe 2 is calculated in accordance with the quantity of resin A calculated hereinbefore, and the inner diameter of the pipe 2. Subtracting the length L1 from the entire length L, the length L2 of the pipe 2 and the service riser 2a is obtained. By adding the length L3 of the bend 5 to the length L2, the length of the pipe 2 and service riser 2a wherein the water is to be filled is obtained. Hence the quantity of water to be injected is calculated in accordance with the inner diameter of the pipe 2.

When the water meter 7 shows that the predetermined quantity of water has been injected, the operation of the pump 8 is stopped. At that time, the mass of resin A is disposed at the end portion of the service pipe 2 as shown in FIG. 2.

Figure 3:
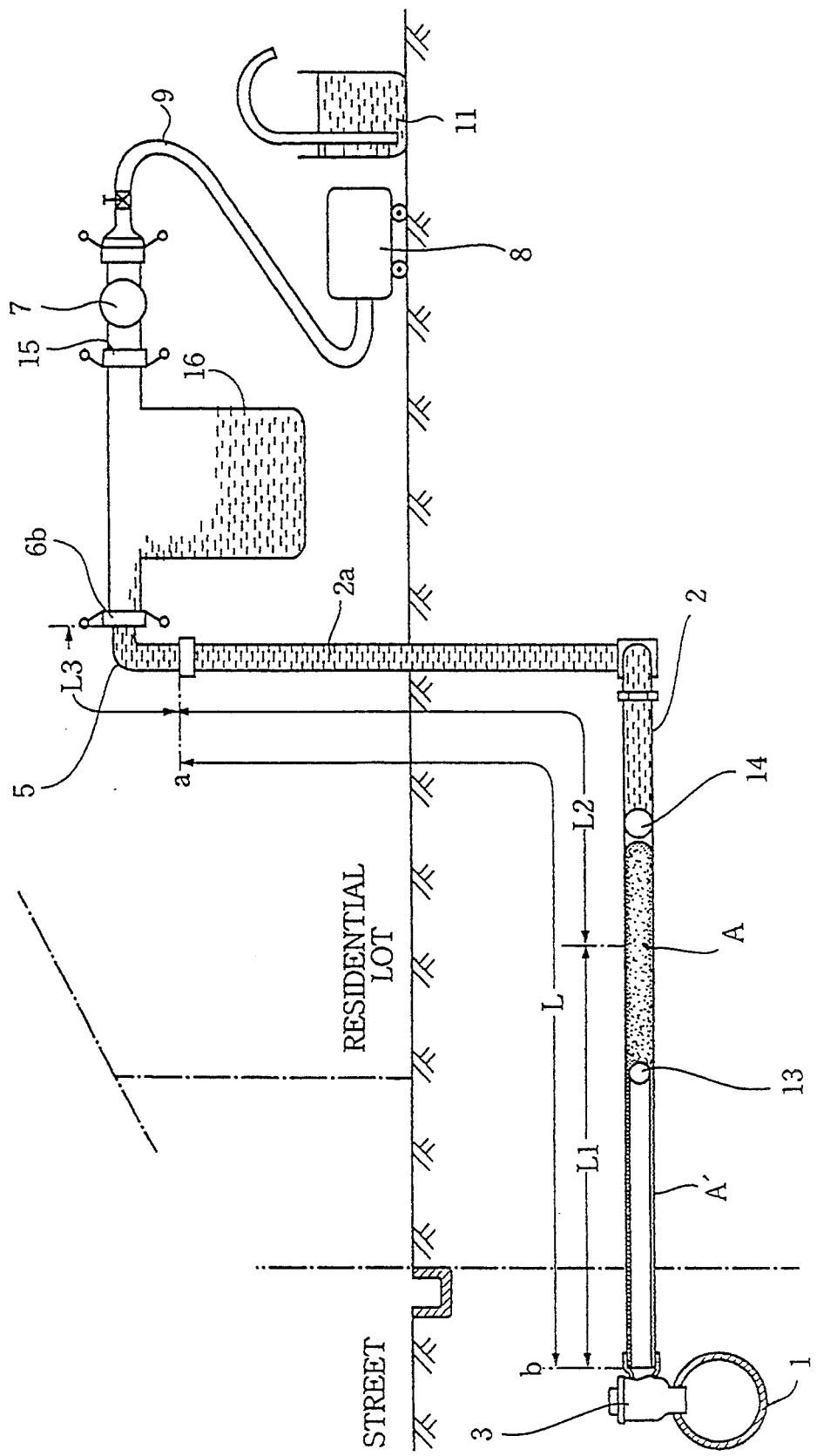
FIG. 3 is a diagram describing a third step of the repairing operation.

Referring to FIG. 3, at the third step of the operation, the hose 9 and the water meter 7 are detached from the clamp coupling 6b so as to interpose a sealed retrieval tank 16 between the bend 5 and the hose 9 through the clamp coupling 6b and a clamp coupling 15, respectively. The water tank 11 is disconnected from the pump 8.

When the pump 8 is driven to generate vacuum, the water in the pipe 2 and the service riser 2a is sucked out, retreating through the bend 5 into the retrieval tank 16. At the same time, the block pig 14, resin A and the lining pig 13 also retreat toward the bend 5. As the mass of resin A travels, a part of the resin A adheres on the inner wall of the pipe, thereby forming a lining A'. The lining pig 13 rolls on the lining so that the lining A' has an appropriate thickness.

By the time the lining pig 13 reaches the position a, all of the resin A is consumed to line the pipe 2 and the service riser 2a. The blocking pig 14 and the lining pig 13 are retrieved in the retrieval tank 16. When the operation is completed, the bend 5 and the rest of the repairing system are disconnected from the service riser 2a, and the gas meter is connected to the service riser 2a.

Figure 5:
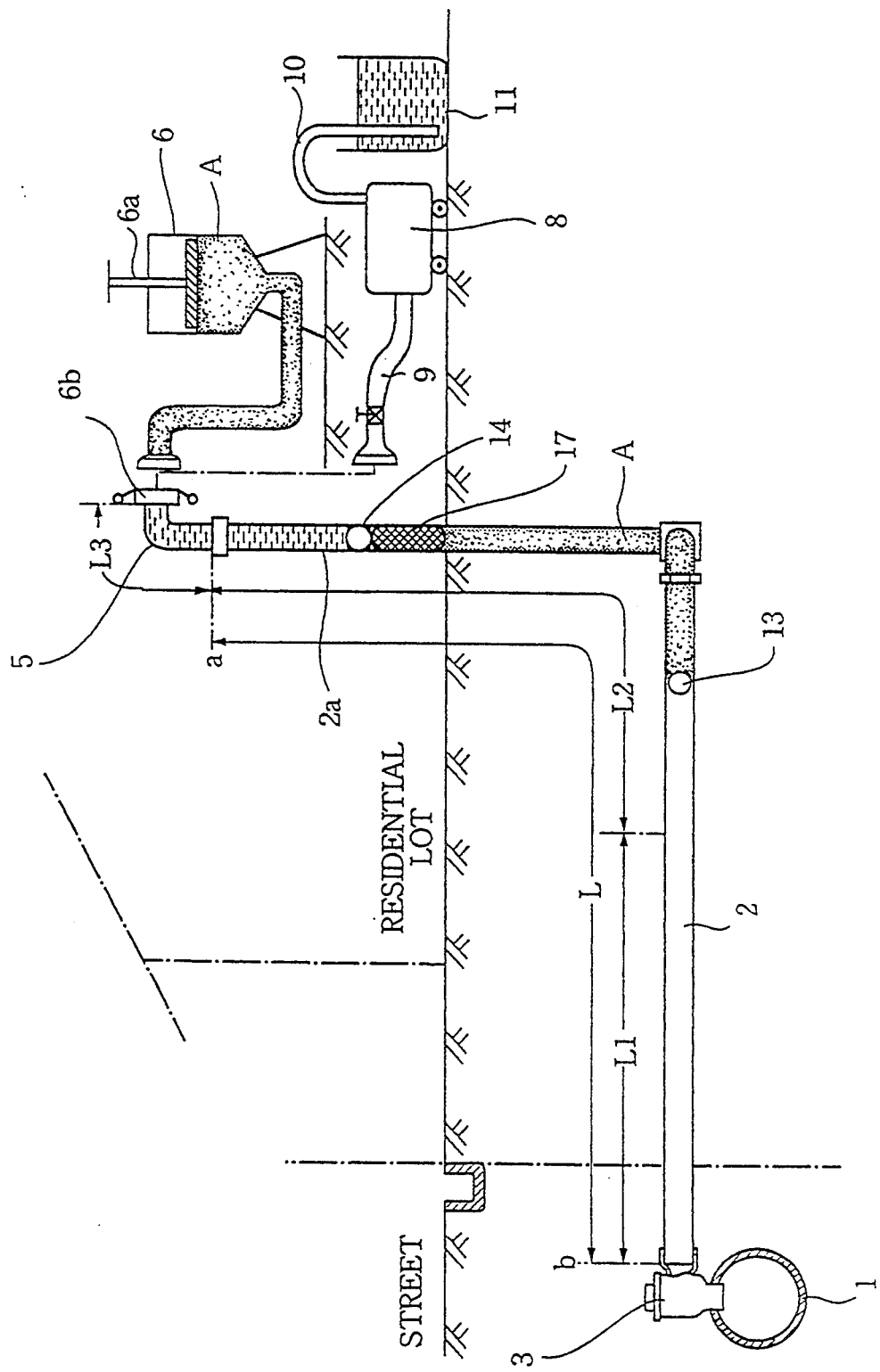
FIG. 5 is a diagram showing a method for repairing a pipe in accordance with a second embodiment of the present invention.

Referring to FIG. 5, in the second embodiment of the present invention, a non-compressible cylindrical absorber 17 made of absorptive high polymer resin is inserted in the pipe 2 at the first step after injecting the resin A, before inserting the blocking pig 14. The absorber 17 has an outer diameter which is substantially the same as the inner diameter of the service pipe 2, and a predetermined length. The absorber 17 is flexible so that the absorber may smoothly pass the bent portion of the pipe 2.

In operation, when the water is injected at the second step, the resin A is completely insulated from the water by the blocking pig 14 and the absorber 17. Namely, should the water chance to seep through a gap between the blocking pig 14 and the inner wall of the pipe 2, the water is absorbed by the absorber 17.

In the third step of the operation, as the water is sucked, there remain drops of water adhered on the inner wall of the pipe 2 and riser 2a. The absorber 17 absorbs the drops and wipes the wall. Therefore, water is not contained in the lining. Hence, lining of a good quality is obtained.

Figure 6:
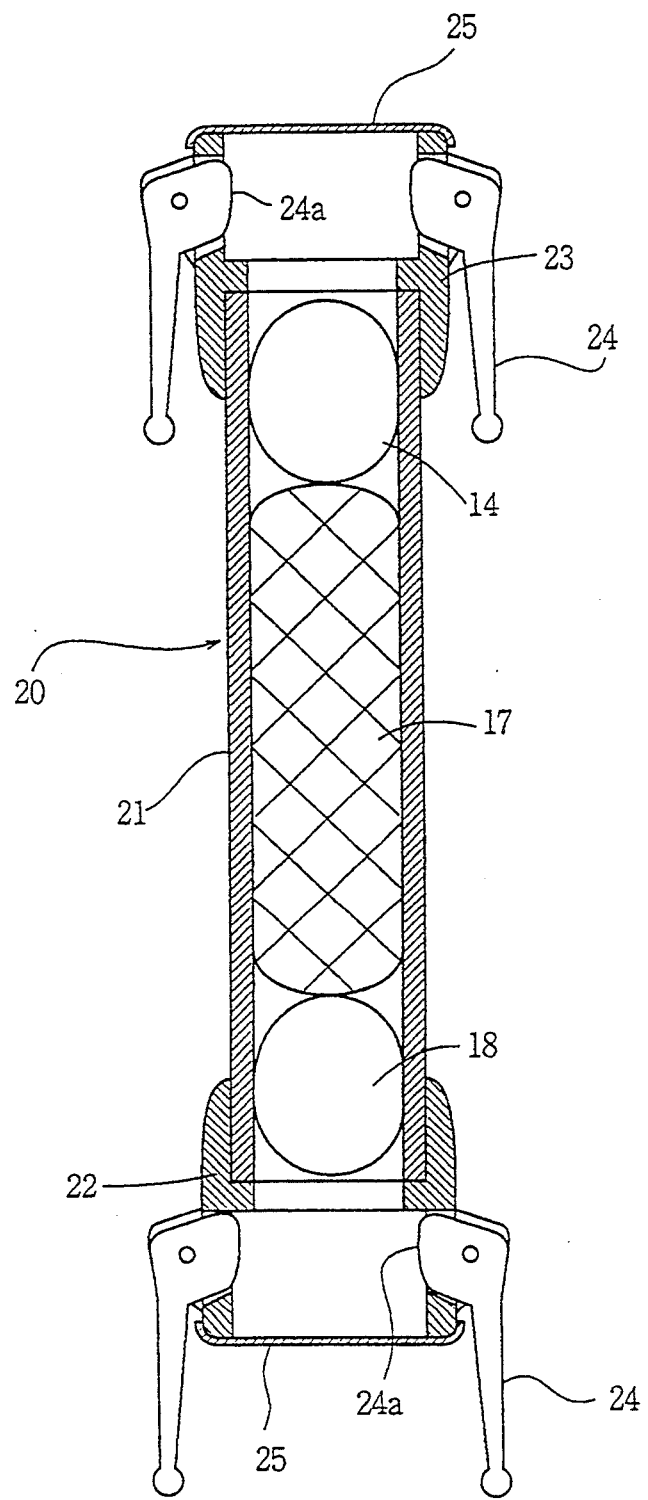
FIG. 6 is a sectional view of a pig cassette used in the operation of a third embodiment.

Referring to FIG. 6, in the third embodiment of the present invention, a sponge pig 18, and the absorber 17 and the blocking pig 14 which have been already described with regards to the first and second embodiment of the present invention are housed in a cylindrical case 21 of a pig cassette 20. The pig cassette 20 is connected to the service riser 2a after the resin is injected.

Referring to FIG. 6, the case 21, the inner diameter of which is substantially the same as that of the pipe 2, has an opening at the either end thereof. Quick-fitting couplings 22 and 23 are mounted on the both ends of the case 21, respectively. The couplings 22 and 23 each have a cap 25 for keeping foreign substances out of the cassette. Each of the couplings 22 and 23 is provided with a pair of levers 24. Each lever 24 has a slant surface 24a so that the coupling 22 can be quickly engaged with an end of the riser 2a.

The sponge pig 18 is a spherical closed-cell urethane foam provided to effectively push the resin A forward. The blocking pig 14 in the present embodiment is a solid silicon resin ball. The outer diameters of the sponge pig 18, absorber 17 and the blocking pig 14 are preferably larger than the inner diameter of the service pipe 2 by 20 to 30%. Experiments have shown that, in order to repair an ordinary service pipe, the inner diameter of which is 25 mm, each of the pigs and the absorber worked most effectively when the outer diameter thereof was 32 mm.

The pig cassette 20 is attached to the service riser 2a in the first step of the operation after the resin A in the tank 6 is injected. The caps 25 on the couplings 22 and 23 are removed and the lower coupling 22 is attached to the service riser 2a by operating the levers 24.

Figure 7:
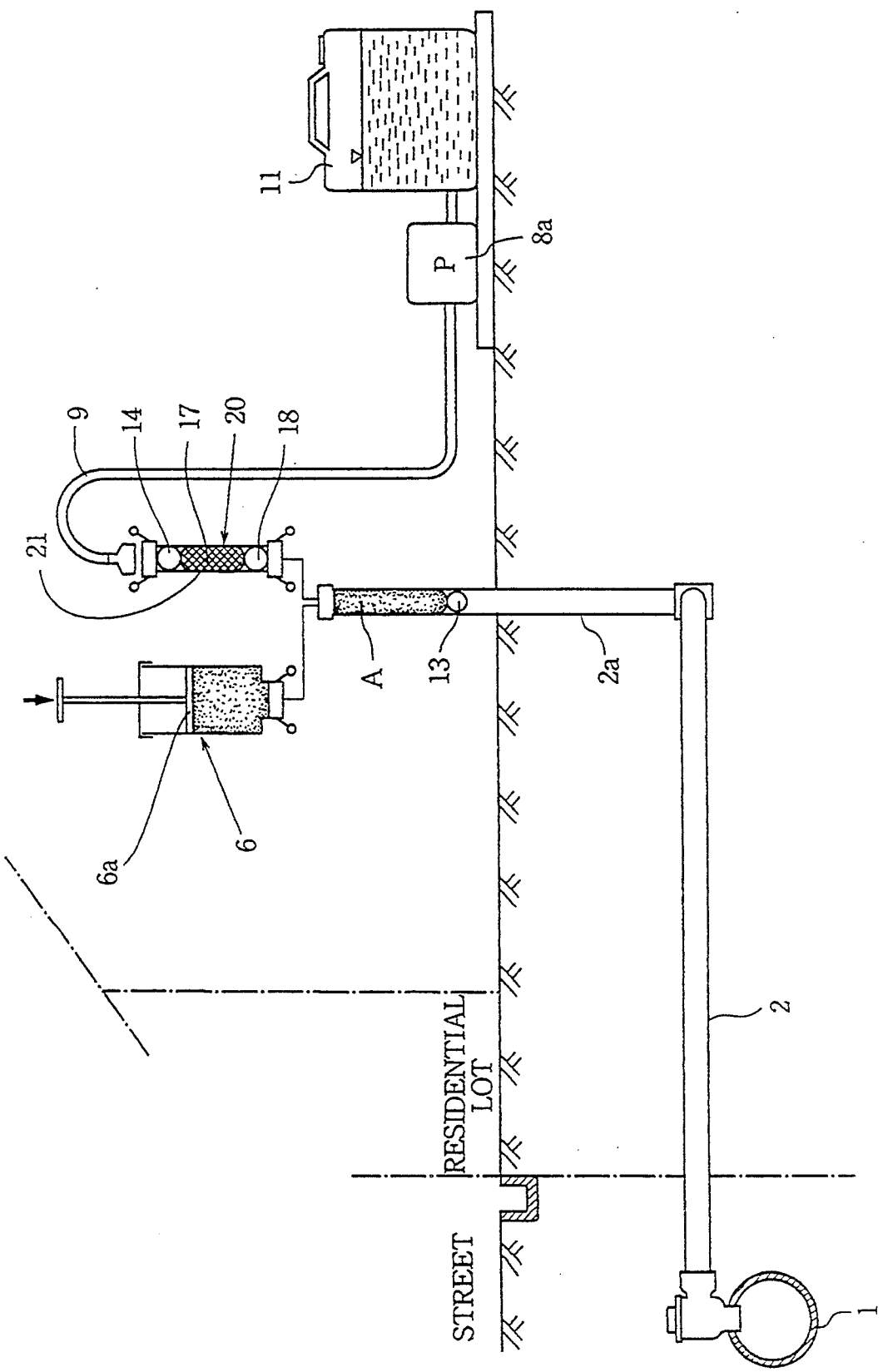
FIG. 7 is a diagram describing first and second steps of the repairing operation of the third embodiment of the present invention.

Referring to FIG. 7, the upper coupling 23 is connected to the hose 9 which is connected to the water tank 11 through a feed pump 8a. When the pump 8a is driven during the second step of the operation, the water in the tank 11 is supplied in the service riser 2a passing through the cassette 20. The mass of resin A is applied with pressure of the water through the sponge pig 18, absorber 17 and the blocking pig 14. The sponge pig 18 wipes the resin adhered on the wall of the pipe so that all of the resin A appropriately reaches the end of the service pipe 2. When the water is charged, the water may flow through a space between the blocking pig 14 and the service pipe 2. However, the absorber 17 absorbs the water so that the resin A is completely insulated from water.

Figure 8:
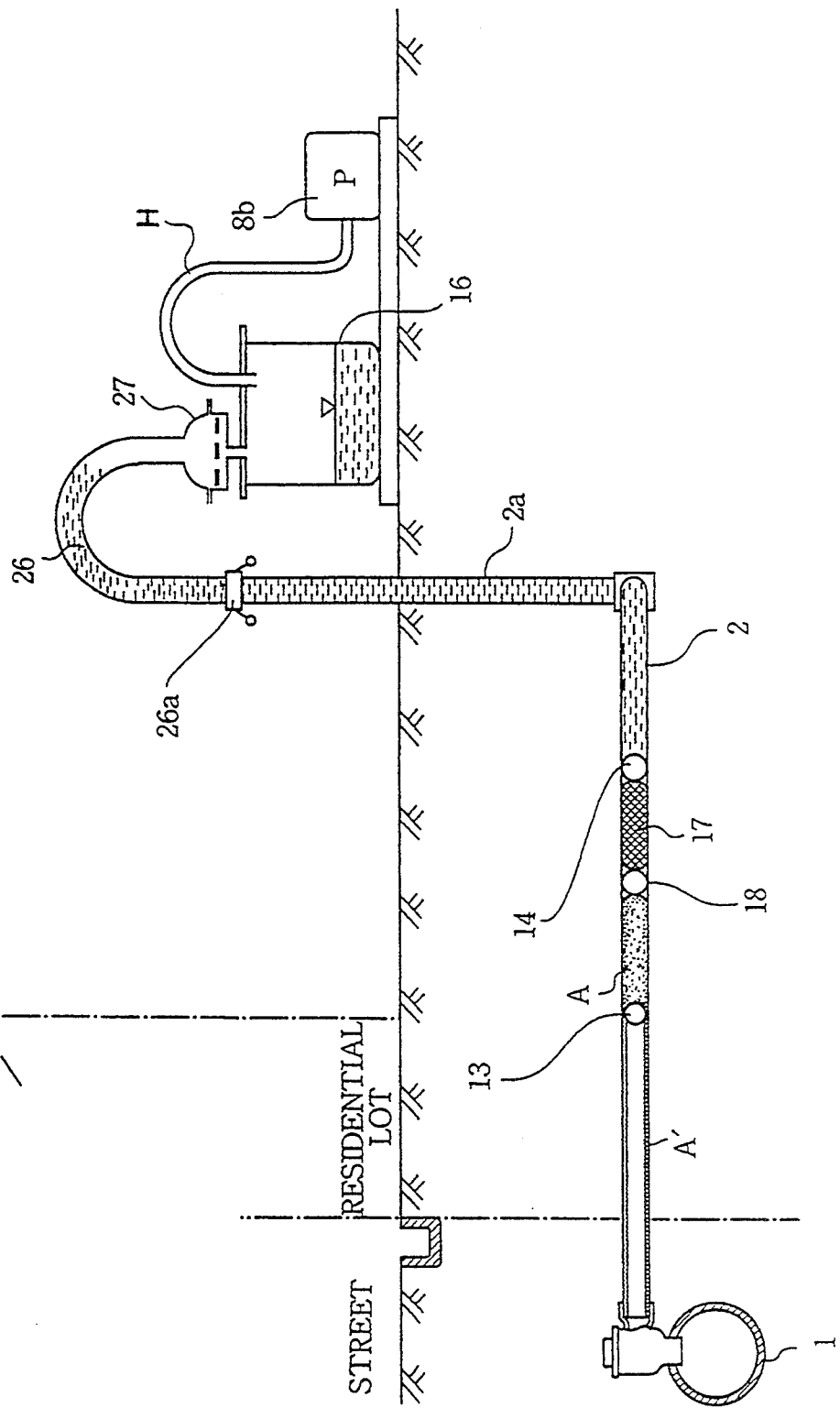
FIG. 8 is a diagram describing a third step of the repairing operation of the third embodiment.

Referring to FIG. 8, in the third step of the third embodiment, the cassette case 21 is removed from the service riser 2a and a pipe 26 is connected to the riser 2a through a coupling 26a. The pipe 26 is communicated with the retrieval tank 16 through a pig catcher 27 which is provided to prevent the blocking pig 14, absorber 17, sponge pig 18 and the lining pig 13 from falling into the tank 16. The retrieval tank is further connected to a vacuum pump 8b through a hose H.

The vacuum pump 8b is driven so that the water in the service riser and the service pipe 2 is drained into the retrieval tank 16. During the operation, the blocking pig 14 wipes away the water on the wall of the pipe 2 and the absorber 17 further absorbs the remaining water in the pipe. Hence the lining A' formed on the wall of the pipe and the riser is free of water drops.

The present embodiment is advantageous in that the sponge pig, absorber, and the blocking pig are provided beforehand in a cassette. Hence the pigs and absorber are properly inserted in the correct order. As a result, the operation can be accurately and efficiently carried out without error.

Figure 9:
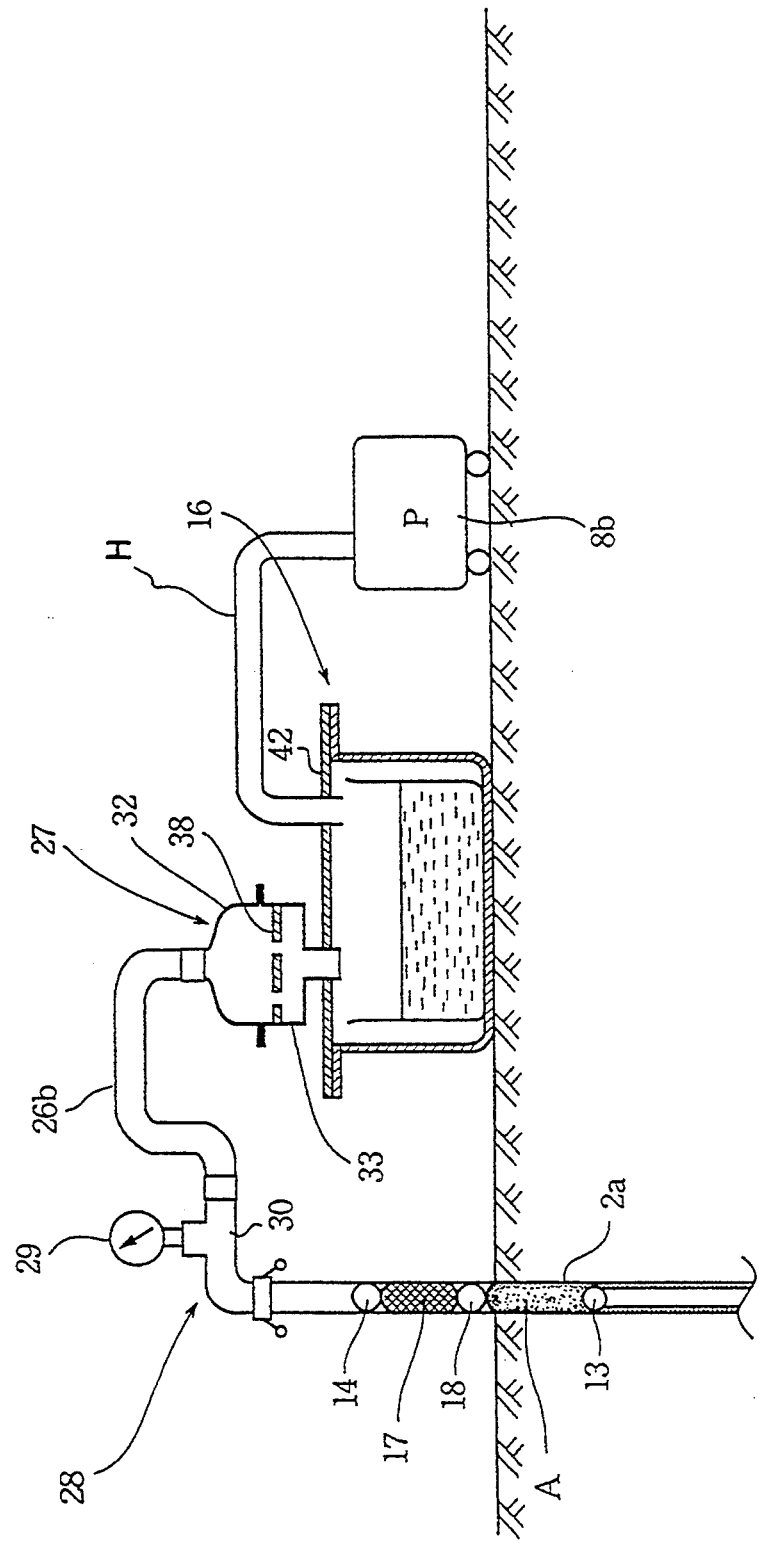
FIG. 9 is a diagram describing a third step of a repairing operation according to a fourth embodiment of the present invention.

Referring to FIG. 9, in the fourth embodiment of the present invention, the retrieval tank 16 to which the water in the service pipe 2 and the service riser 2a is drained is connected to the service riser 2a through a detecting unit 28 having a pressure gauge 29, a suction hose 26b, and the pig catcher 27.

Figure 10:
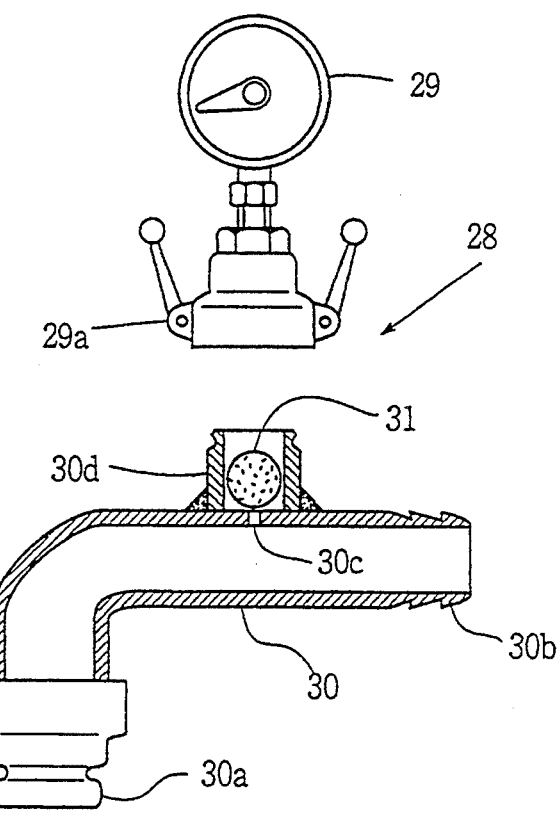
FIG. 10 is an enlarged diagram of a detector unit provided in the operation of the fourth embodiment.

As shown in FIG. 10, the detecting unit 28 comprises a pipe 30 having at the ends thereof, a nipple 30a which is to be connected to the service riser 2a and a nipple 30b connected to the suction hose 26b. Mounted on the pipe 30 is a connecting nipple 30d, the inner spaces thereof communicated with each other through a small opening 30c. A sponge ball 31 of open-cell foam adapted to allow passage of water but not of resin is stuffed into the nipple 30d. The pressure gauge 29 is attached on the nipple 30d through a coupling 29a.

Figure 11:
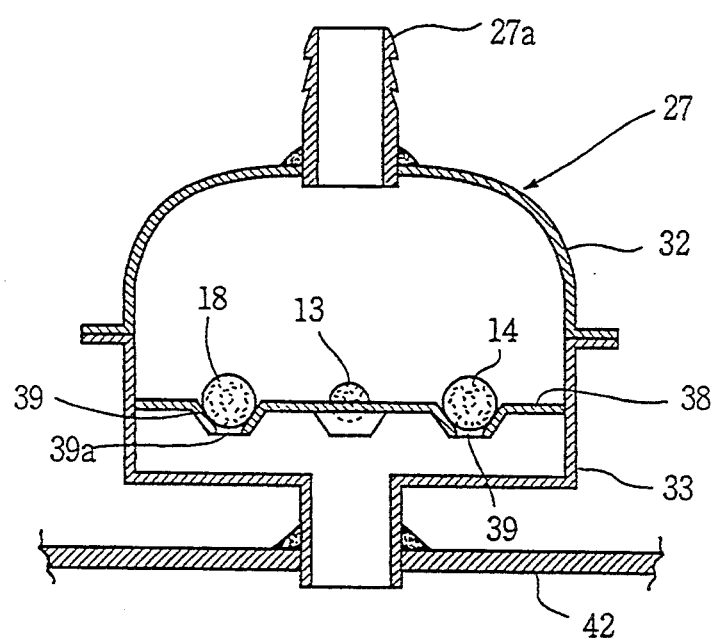
FIG. 11 is an enlarged diagram of a pig catcher provided in the operation of the third and fourth embodiment.

Referring to FIG. 11, the pig catcher 27 is divided into an upper portion 32 and a lower portion 33, detachable from each other, thereby facilitating the retrieval of the pigs. The upper portion 32 is connected to the suction hose 26b through a nipple 27a and the lower portion 33 is attached to a cover 42 of the retrieval tank 16. Disposed in the lower portion 33 of the pig catcher 27 is a horizontal return pig stopper plate 38. The stopper plate 38 has three recesses 39 where the pigs 13, 14 and 18 fit in. Each recess 39 has an opening 39a and is so designed that the diameter thereof becomes smaller toward the bottom end like the funnel. Thus, a pig of any size can snugly fit in the opening.

In the third step of the operation, the detecting unit 28, pig catcher 27, retrieval tank 16 and the vacuum pump 8b are connected to the service riser 2a in order to drain water from the service pipe 2. As the vacuum pump 8b is driven, the pressure gauge 29 detects the pressure in the pipe 30 through the sponge ball 31.

Before the pig 13 passes through the pipe 30, the pressure therein is negative. After the lining pig 13 passes through the pipe 30, due to the gas from the gas main 1, the pressure in the pipe 30 quickly rises to a positive value. Hence, by watching the pressure gauge 29, it can be determined that the operation is completed.

Extra resin which had not been consumed may flow back with the pig 13 and enter through the opening 30c. However, the sponge ball 31 prevents the further entry of the resin, thereby protecting parts of the pressure gauge 29 such as an air vent, bourdon tube and diaphragm. Hence the pressure gauge 29 is prevented from breaking.

Meanwhile, the blocking pig 14, absorber 17, sponge pig 18 and the lining pig 13 are trapped in the pig catcher 27. The spheric pigs 13, 14 and 18 are held in the recesses 39 of the return pig stopper plate 38, thereby blocking the communication between the service riser 2a and the return tank 16. Thus the gas is prevented from abruptly flowing through the pipe, thereby preventing the newly formed lining from being broken by the pulsation of the gas. Moreover, the gas does not leak out.

In the embodiments of the present invention, other uncompressible liquid besides water may be used to apply pressure to the resin mass.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A method of lining an inner surface of a pipe, comprising:

calculating an amount of resin necessary for lining the inner surface of the pipe;

calculating an amount of a pressurized non-compressible liquid necessary for feeding the resin to an inner end of the pipe so as to permit a lining pig and the resin to travel to the inner end of the pipe;

inserting the lining pig in the pipe from an open end thereof;

supplying the calculated amount of resin in the pipe from the open end subsequent to the insertion of the lining pig;

inserting a blocking pig in the pipe behind the resin;

supplying the calculated amount of pressurized non-compressible liquid into the pipe subsequent to the insertion of the blocking pig thereby feeding the supplied resin through the pipe by forcing the blocking pig with the pressurized liquid until the lining pig and a front end of the resin behind the lining pig reaches the inner end of the pipe without erupting the resin out through gaps between the lining pig and the inner surface of the pipe; and sucking the pressurized liquid together with the supplied resin, the lining pig and the blocking pig toward the open end of the pipe whereby the inner surface of the pipe is lined with the resin by the lining pig.

2. A method of lining an inner surface of a pipe as claimed in claim 1, wherein a pressure from the blocking pig to the open end of the pipe of the pressurized non-compressible liquid is maintained substantially constant until the front end of the resin behind the lining pig reaches the inner end of the pipe.

3. The method according to claim 1 wherein the resin is supplied by pumping means, and the pressurized liquid is supplied and sucked by a pump.

4. The method according to claim 1 further comprising inserting a non-compressible liquid absorbing member between the resin and the blocking pig.

5. The method according to claim 1 further comprising inserting a sponge pig behind the resin, and inserting a non-compressible liquid absorbing member between the sponge pig and the blocking pig.

6. The method according to claim 3 further comprising attaching a return pig stopper plate in a suction pipe provided between the pipe and the pump, the pig stopper plate having at least two holes which are formed to be closed by the lining pig and the blocking pig respectively, whereby, at the end of the suction step, both the holes are closed to stop the suction.

7. The method according to claim 5 wherein the sponge pig, absorbing member and blocking pig are inserted in a cylindrical cassette, the cassette is fixed to the open end of the pipe, and the sponge pig, absorbing member and blocking pig are inserted behind the resin by the pressurized liquid.

* * * * *